United States Patent [19]

Rickett

[11] Patent Number: 5,141,815

[45] Date of Patent: Aug. 25, 1992

[54] COATING CONTAINING EPOXY RESIN-PHOSPHO(R OR N)IC ACID PRODUCT

[75] Inventor: Clive J. Rickett, Bühl-Eisental, Fed. Rep. of Germany

[73] Assignee: The Dow Chemical Company, Midland, Mich.

[21] Appl. No.: 449,430

[22] Filed: Dec. 12, 1989

Related U.S. Application Data

[63] Continuation of Ser. No. 196,419, May 20, 1988, abandoned.

[30] Foreign Application Priority Data

May 22, 1987 [GB] United Kingdom ............... 8712121

[51] Int. Cl.⁵ .................... B32B 15/08; B32B 27/38; B05D 3/02; C08L 63/02
[52] U.S. Cl. .................... 428/418; 427/386; 523/427; 525/481; 525/485
[58] Field of Search ............... 525/481, 485; 523/427; 427/386; 428/418

[56] References Cited

U.S. PATENT DOCUMENTS

| | | | |
|---|---|---|---|
| 2,732,367 | 1/1956 | Shokal | 525/340 |
| 2,887,404 | 5/1959 | Evans | 525/523 |
| 3,454,418 | 7/1969 | Forsberg | 525/481 |
| 3,519,493 | 7/1970 | Farone | 525/481 |
| 4,059,550 | 11/1977 | Shimp | 523/404 |
| 4,508,765 | 4/1985 | Ring et al. | 525/481 |

*Primary Examiner*—Robert E. Sellers

[57] ABSTRACT

A film-forming resin composition comprising
(A) from 1 to 10 weight percent of a phenolic resin,
(B) from 10 to 89 weight percent of an epoxy resin and
(C) from 10 to 89 weight percent of a reaction product between a epoxy resin and a phosphoric or phosphonic acid or monoalkyl orthophosphate, based on the total weight of (A), (B) and (C), is very useful for coating metallic substrates. The cross-linked composition gives colorless coatings of high toughness, flexibility, adhesion and chemical resistance.

23 Claims, No Drawings

COATING CONTAINING EPOXY RESIN-PHOSPHO(R OR N)IC ACID PRODUCT

CROSS-REFERENCE TO RELATED APPLICATION

This is a continuation of application Ser. No. 196,419, filed May 20, 1988, now abandoned.

BACKGROUND OF THE INVENTION

This invention relates to film-forming resin compositions, a method for preparing them and their use for coating substrates, preferably metallic substrates.

GB-A-2 107 321 discloses a heat-curable water-dispersible film-forming resin composition which is the reaction product of a water-insoluble phenolic resin with an epoxy resin and a phosphoric acid.

This composition can be used alone or mixed with a water-dispersible epoxy resin for producing coating compositions. When the resin composition is mixed with a water-dispersible epoxy resin, the phenolic to total epoxy resin ratio is at least 1:5, preferably at least 1:3.

Furthermore, U.S. Pat No. 4,059,550 discloses an aqueous dispersion of a heat curable coating composition which is made from a mixture of (I) a complex polyhydroxy polyether resin which is for example terminated with epoxy groups and (II) a phenolplast resin whereby as a catalyst for the curing reaction an adduct of phosphoric acid and a glycidyl polyether of a polyhydric phenol is used.

However, formulations based on such compositions, to achieve sufficient chemical resistance for their use in food contact applications, contain an amount of phenolplast resin which renders the final coating yellow or gold in colour.

Accordingly, coating compositions disclosed in GB-A-2,107,321 and U.S. Pat. No. 4,059,550 are not suited for applications where a stable, clear or white pigmented coating system is desirable.

EP-A-0,002,718 discloses a heat curable coating composition comprising an epoxy resin and a trimellitic anhydride-glycol ester. Such a composition gives colourless coatings suitable for white pigmentation and limited use in sanitary container applications. However, formulations based on such compositions tend to be unstable with respect to viscosity versus time due to the inherent reactivity of the anhydride species and are limited in their application due to the resulting chemical resistance properties of the cured coating.

Accordingly, it remains desirable to provide a film-forming resin composition which is useful for producing clear or white pigmented coatings which are suitable for sanitary applications.

SUMMARY OF THE INVENTION

Accordingly, one aspect of the present invention is a film-forming resin composition comprising
(A) from 1 to 10 weight percent of a phenolic resin,
(B) from 10 to 89 weight percent of an epoxy resin and
(C) from 10 to 89 weight percent of a reaction product between an epoxy resin and a phosphoric or phosphonic acid, based on the total weight of (A), (B) and (C).

Another aspect of the present invention is a method of preparing this resin composition by preparing a blend of the components (A), (B) and (C).

Still another aspect of the present invention is the use of this resin composition for coating substrates, preferably metallic substrates.

Still another aspect of the present invention is a substrate, preferably a metallic substrate, being at least partially coated with a coating prepared from this resin composition.

The film-forming resin composition of the present invention shows excellent viscosity stability over a period of time. It is very useful for preparing thermosetting coatings for metallic substrates. The cross-linked resin composition gives essentially colourless coatings of high toughness, flexibility, adhesion and chemical resistance making its use especially suited for the lining of containers for sanitary applications such as containers for food or beverages or cosmetics such as tooth pastes.

DETAILED DESCRIPTION OF THE INVENTION

The film-forming resin composition of the present invention comprises from 1, preferably from 3, most preferably from 4 weight percent, and up to 10, preferably up to 7, most preferably up to 6 weight percent of a phenolic resin (A).

Suitable phenolic resins are for example reaction products of monohydric or polyhydric phenols with an aldehyde. Typical examples are resins prepared from phenol, resorcinol, o-, m- or p-cresol, xylenol, para-tertiarybutyl phenol, nitrophenol or 2,2-bis(4-hydroxyphenol) propane condensed with formaldehyde, acetaldehyde or propionaldehyde.

Preferred phenolic resins are polyalkylol phenols wherein the phenolic functionality has been at least partially etherified with e.g. methyl, ethyl or butyl groups.

Illustrative examples of phenolic resins useful herein are described in "Encyclopedia of Polymer Science and Technology", Volume 10, pages 1–68, Interscience Publishers (1969) which is hereby incorporated by reference.

The phenolic resin is preferably solid or semi-solid at ambient temperature.

Preferred phenolic resins are those commercially available from Hoechst AG as PHENODUR PR 401, PR 515, PR 612, PR 722 or from General Electric as METHYLON 75108, or from Reichhold as VARCUM 29-170.

The film-forming resin composition of the present invention further comprises from 10, preferably from 35, most preferably from 53 weight percent, and up to 89, preferably to 75, most preferably to 61 weight percent of an epoxy resin (B).

The epoxy resin should preferably contain on the average at least 1, most preferably from 1 to 4 epoxide groups, per molecule.

Illustrative examples of epoxy resins useful herein are described in *The Handbook of Epoxy Resins* by H. Lee and K. Neville, published in 1967 by McGraw-Hill, New York, in appendix 4-1, pages 4–56 and U.S. Pat. Nos. 2,633,458; 3,477,990 (particularly column 2, line 39 to column 4, line 75); 3,821,243; 3,970,719; 3,975,397 and 4,071,477 and G.B. Patent Specification No. 1,597,610, all of which are incorporated herein by reference.

Epoxy resins of particular interest in the practice of the present invention include diglycidyl ethers of bisphenol compounds, particularly those compounds represented by the following general structural formula:

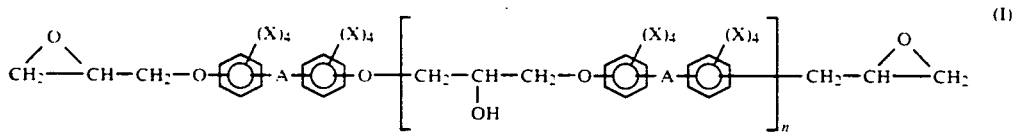

wherein:
each A is independently a divalent hydrocarbon group having from 1 to 6 carbon atoms, preferably methylene or isopropylidene, or a covalent bond;
each X is independently hydrogen, an alkyl group of 1 to 6 carbon atoms or halogen, preferably chlorine or bromine; and
n has an average value of from 0 to 50, preferably from 5 to 25, most preferably from 10 to 18.

The epoxy resin (B) is preferably solid or semi-solid at ambient temperature prior to curing.

The average epoxy equivalent weight is preferably from 172, more preferably from 1200, and preferably up to 20000, more preferably up to 5000.

The epoxy equivalent weight is the weight of epoxy resin (in grams) containing one equivalent of epoxy.

Particularly preferred epoxy resins are those wherein each A is methylene or isopropylidene, each X is independently hydrogen or bromine and n is on the average from 10 to 18. Preferred examples of these resins are bisphenol A type epoxy resins having an average epoxy equivalent weight of from 1200 to 5000. Such resins are commercially available from The Dow Chemical Company as D.E.R. 667 E, D.E.R. 668 E and D.E.R. 669 E epoxy resins.

The film-forming composition of the present invention further comprises from 10, preferably from 22, most preferably from 35 weight percent, and up to 89, preferably to 62, most preferably to 43 weight percent reaction product (C).

The reaction products (C) between an epoxy resin and a phosphoric or phosphonic acid are known from U.S. Pat. Nos. 2,541,027; 4,164,487; 4,289,812 and 4,397,970.

The reaction product (C) is preferably of the type described in detail in U.S. Pat. Nos. 4,397,970 and 4,164,487 prior to the addition of the neutralising amine, which is hereby incorporated by reference.

The epoxy resin component of the reaction product (C) is preferably of the type described above for epoxy resin (B) of formula I but where n has an average value of from 0 to 50, preferably from 0 to 25 and most preferably from 0 to 15.

The phosphoric acid used for preparing the reaction product (C) is most conveniently in the form of commercial anhydrous orthophosphoric acid or aqueous phosphoric acid having a concentration of at least 60 percent, but condensed forms of phosphoric acid such as polyphosphoric acid or pyrophosphoric acid can be used, as can phosphoric acid semi-hydrate $2H_3PO_4 \cdot H_2O$.

The reaction product (C) between an epoxy resin and a phosphoric or phosphonic acid can be prepared as described in U.S. Pat. Nos. 4,397,970; 4,164,487 and 4,289,812. The reaction product (C) preferably contains from 0.1 to 10, more preferably from 0.5 to 4 weight percent phosphoric acid, based on the total amount of epoxy resin and phosphoric acid.

The resin composition of the present invention can be prepared by blending the components (A), (B) and (C). A convenient form of mixing the resin components A, B and C and rendering them suitable for coating the substrate is by dissolving them in an organic solvent. Various solvents or mixtures thereof may be employed for this purpose and may for example include glycol ethers or their acetates such as ethoxyethanol, methoxypropanol or butoxyethanol; esters such as ethyl acetate, isopropyl acetate, butyl acetate or amyl acetate; or ketones such as methyl ethyl ketone, methyl isobutyl ketone or cyclohexanone. Additionally, hydrocarbons may be included such as toluene or xylene or alcohols such as butanol, such that good wetting properties and drying characteristics are achieved for the intended substrate, coating technology and curing method.

The resin composition preferably comprises one or more of the above-mentioned solvents. The total weight of the sum of phenolic resin (A), epoxy resin (B) and reaction product (C) is preferably from 20 to 50 percent, more preferably from 30 to 40 percent, based on the total weight of the sum of (A), (B) and (C) and the solvent(s).

The resin composition of the present invention is very useful for providing unpigmented clear coatings which do not have a yellowish appearance.

The resin composition of the present invention is also very useful for providing pigmented coatings without the yellowing normally caused by the presence of a phenolic resin. For example, pigmentation with titanium dioxide will result in bright white coatings with excellent chemical resistance. The pigmented resin composition preferably comprises one or more of the above-mentioned solvents. The total weight of the sum of phenolic resin (A), epoxy resin (B) and reaction product (C) is preferably from 10 to 40 percent, more preferably from 20 to 30 percent, based on the total weight of the sum of (A), (B) and (C), the pigment(s) and the solvent(s).

The weight of the pigment(s) is preferably from 10 to 30 percent, more preferably from 15 to 25 percent, based on the total weight of the sum of (A), (B) and (C), the pigment(s) and the solvent(s).

The resin composition of the present invention can also contain known additives, for example agents for promoting cross-linking or improving the flow of the resin composition.

The coating composition can be applied to substrates such as glass, plastics or metals, preferably metals such as low tinned steel, chromed steel, black plate or aluminium, either as sheets or continuous coils by methods such as roller coating, spray coating, dip coating or curtain coating. Preformed shapes may also be coated, for example food or beverage cans by spray, dip or rinse coating techniques.

Curing or cross linking of the resin composition is preferably effected by heating the coated substrate in an air circulated oven to between 100° C. and 300° C., more preferably between 180° C. and 225° C. for between 30 seconds and 30 minutes, more preferably 6 to 15 minutes. Alternatively, this operation may be conducted by induction heating of the coated substrate or by its exposure to infra-red radiation.

The present invention is further illustrated by the following examples which do not limit the scope of the invention. Unless otherwise specified, all parts and percentages are by weight.

The following components are used for preparing the film-forming composition of the present invention:

Phenolic resin (A): a phenolic resin which is commercially available from Hoechst AG under the trademark PHENODUR PR 401, epoxy resin (B): a reaction product of epichlorohydrin and bisphenol-A which is commercially available from The Dow Chemical Company under the trademark D.E.R. 668 E, reaction product (C) between an epoxy resin and phosphoric acid (hereafter called: epoxy phosphate ester): the epoxy phosphate ester prepared as described below, solvent mixture (D): a mixture of methoxypropanol, xylene and n-butanol in a weight ratio of 2:2:1.

Epoxy Phosphate Ester (C) Preparation

To a 10 kg steel reactor equipped with oil heating, stirrer and reflux condenser, 4131 g of D.E.R. 330 (trademark) epoxy resin is charged, together with 2068 g of bis-phenol-A. The mixture is stirred and heated to 90° C. and when homogenous, 600 ppm of ethyltriphenylphosphonium acetate is added. Heating is continued until an exotherm occurs at 145° C.

The temperature is held at 165° C. for 60 minutes after which time 1317 g of butoxyethanol is charged and mixed at 135° C. for 30 minutes until a solution is formed. Next, 310 g of a 25% solution of polyphosphoric acid in DOWANOL EB (trademark) glycol ether is added and stirred for an additional 60 minutes. Phosphorylation is complete when the epoxy content is reacted down to less than 0.1%.

2870 g of methoxypropanol is added after approximately 60 minutes and the mixture is stirred at 130° C. for a further 30 minutes.

Hydrolysis of the di- and tri-ester is effected by the addition of 100.4 g of demineralised water and maintaining the reaction at 130° C. for a final 150 minutes after which time the produced epoxy phosphate ester is cooled and analysed.

The product has a non-volatile content of 60 percent, based on the total weight of epoxy phosphate ester and solvent.

EXAMPLE 1

Clear Lacquer Formulation 22.80 parts by weight (pbw) of the epoxy phosphate ester (C) is mixed with 20.52 pbw of the epoxy resin (B) in 54.11 pbw of the solvent blend (D). To this mixture 2.57 pbw of the phenolic resin (A) is added with stirring and left for 12 hours at room temperature.

The formulation has a non-volatile content of 36% and a Brookfield viscosity of 320 mPa.s. The weight ratio of epoxy phosphate ester (C): epoxy resin (B): phenolic resin (A) is 38:57:5.

Lacquer Properties

Coatings are made on E2 tinned steel from Rasselstein AG and then cured in an air-circulated oven at 200° C. for various times.

The cured film undergoes the following tests:

I. Solvent Resistance the coated plate is rubbed with an acetone soaked cotton pad until the film coating is affected. The number of double rubs is counted.

II. Flexibility ("wedge bend")

measured as described in Verpackungs-Rundschau 25 (1974), Nr. 6, Tech.-wiss. Beilage, pages 47 and 48.

III. Cross-Hatch Adhesion measured according to DIN 53 151.

IV. Adhesion/Flexibility ("Erichsen Square Cup")

Erichsen square cups of 40 mm × 40 mm are drawn on an Erichsen cupping machine model 142 and the adhesion/ flexibility of the coating is tested. The best appearance is rated as 1, the worst one as 8.

V. Acid Resistance

Erichsen square cup appearance after boiling for 60 minutes in a 2% tartaric acid solution at 120° C. Rated 1-8 as above.

|  | Cure time (min at 200° C.) | | | |
| --- | --- | --- | --- | --- |
|  | 8' | 10' | 12' | 20' |
| Dry coating thickness (micrometers) | 4.2 | 4.7 | 4.6 | 5.0 |
| Solvent Resistance | 30 | 40 | 45 | 50 |
| Wedge Bend (%) | 76 | 78 | 77 | 77 |
| Cross-hatch Adhesion (%) | 100 | 100 | 100 | 100 |
| Erichsen Square cup | 1 | 1 | 1 | 1 |
| Acid Resistance | 2 | 3 | 3 | 4 |

EXAMPLE 2

Pigmented Lacquer Formulation

A millbase (predispersion) is prepared by dispersing 60.6 of pbw titanium dioxide in 10.1 pbw of the epoxy phosphate ester (C) solution described above and diluting this mixture with 29.3 pbw of the above mentioned solvent blend (D).

A formulation is made by dissolving 14.3 pbw of epoxy resin (B) in 38.4 pbw of said solvent blend (D), then mixing in 33 pbw of the above described millbase, 1.8 pbw of phenolic resin (A) and an additional 12.5 pbw of the epoxy phosphate ester (C) solution described above.

The resulting formulation has a non-volatile content of 45% and a pigment: (epoxy phosphate ester (A)-+epoxy resin (B)+phenolic resin (C)) ratio of 0.8:1. The weight ratio of epoxy phosphate ester (C): epoxy resin (B): phenolic resin (A) is 38:57:5.

Formulation Stability

The stability of the pigmented lacquer formulation of Example 2 is demonstrated by monitoring the change in viscosity with time over a three month period at 40° C. Viscosity after X weeks at 40° C. (mPa.s at 25° C.)

|  | X weeks | | | | |
| --- | --- | --- | --- | --- | --- |
|  | 0 | 3 | 6 | 9 | 12 |
| Viscosity (mPa.s) | 240 | 240 | 240 | 250 | 260 at 25° C.) |

Lacquer Properties

Coatings are made and tested according to the procedures in Example 1.

| | Cure time (min at 200° C.) | | | |
|---|---|---|---|---|
| | 8 | 10 | 12 | 20 |
| Dry coating thickness (micrometers) | 6.6 | 6.5 | 6.2 | 6.9 |
| Solvent Resistance | 10 | 14 | 17 | 30 |
| Wedge bend (%) | 65 | 64 | 65 | 63 |
| Cross-hatch adhesion (%) | 100 | 100 | 100 | 100 |
| Erichsen Square cup | 1 | 1-2 | 1-2 | 2 |
| Acid Resistance | 2 | 2 | 2-3 | 3 |

EXAMPLE 3

The significance of the ratio between epoxy phosphate ester (C) and epoxy resin (B) is illustrated below. A number of formulations are prepared with various ratios of the two components (C) and (B), keeping constant the amount of phenolic resin (A) (5 pbw) and curing conditions (10 min at 200° C.).

| | Epoxy resin (B) | | | | | | |
|---|---|---|---|---|---|---|---|
| | | | | | | | 0.95 |
| Epoxy | 95:0 | | | | | | VII |
| phos- | I (com- | | | | | | (com- |
| phate ester (C) (pbw) | para- tive) | 76:19 II | 65:30 III | 57:38 IV | 38:57 V | 19:76 VI | para- tive) |
| Solvent Resistance | 3 | 5 | 5 | 14 | 20 | 20 | 100 |
| Wedge bend % | 42 | 56 | 61 | 64 | 70 | 63 | 60 |
| Erichsen Square cup | 1 Y | 1 | 1 | 1-2 | 1-2 | 1-2 | 1-2 |
| Acid Resistance | 1-2 B | 1-2 B | 2 | 2 | 3 | 4-5 SB | 6 SB | where Y implies that a coating has a definite yellow tint with a Gardner colour of approximately 2.

B and SB imply (slight)blushing of the coating indicating a loss of acid resistance.

Sufficient phosphoric acid is added to the formulations I, II, IV and VI to make the total amount of free and reacted phosphoric acid in each, the same as that reacted in formulation VII.

The effect of varying the phenolic resin (A) content for the given weight ratio between epoxy resin (B) and epoxy phosphate ester (C) of 57 pbw:38 pbw is illustrated below:

| | Phenolic resin content (pbw) | | |
|---|---|---|---|
| | 3 | 5 | 7 |
| Solvent Resistance | 4 | 14 | 15 |
| Wedge bend % | 62 | 64 | 66 |
| Erichsen Square cup | 1-2 | 1-2 | 1-2 |
| Acid Resistance | 2 SB | 2 | 3-4 |

What is claimed is:

1. A resin composition which is curable to provide a colorless or pigmented coating without substantial yellowing, said resin composition comprising
   (A) from 3 to 7 percent of a phenolic resin,
   (B) from about 38 to about 65 percent of an epoxy resin, and
   (C) from about 30 to about 57 percent of a reaction product between an epoxy resin and a phosphoric or phosphonic acid.

dissolved in an organic solvent capable of dissolving (A), (B) and (C), said percentages being based on the total weight of (A), (B) and (C).

2. The resin composition of claim 1 wherein the epoxy resin (B) is a resin of formula I

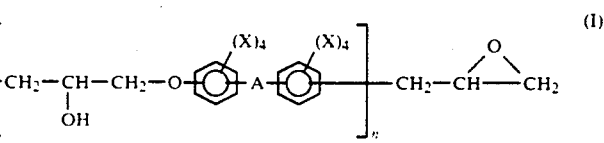

wherein
   each A independently is a divalent hydrocarbon group having from 1 to 6 carbon atoms or a covalent bond;
   each X independently is hydrogen, an alkyl group of 1 to 6 carbon atoms or halogen; and
   n has an average value of from 0 to about 50 and wherein the reaction product (C) is the reaction product between said epoxy resin and a condensed form of phosphoric acid in a condensed form.

3. The resin composition of claim 1 wherein the epoxy resin (B) is a resin of formula I

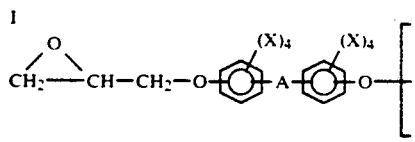

wherein each A is isopropylidene, each X is hydrogen and n has an average value of from about 5 to about 25.

4. The resin composition of claim 1 wherein the reaction product (C) is the reaction product between an epoxy resin of formula I

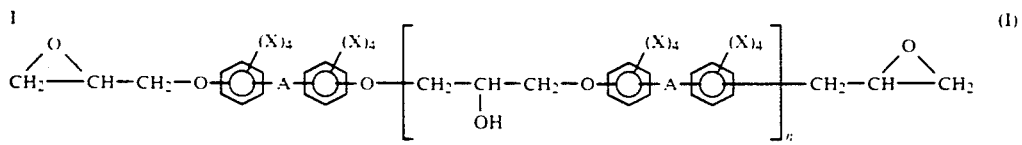

wherein each A is isopropylidene, each X is hydrogen and n has an average value of from 0 to about 15 and a condensed form of phosphoric acid.

5. The resin composition of claim 1 wherein the epoxy resin (B) is a resin of formula I

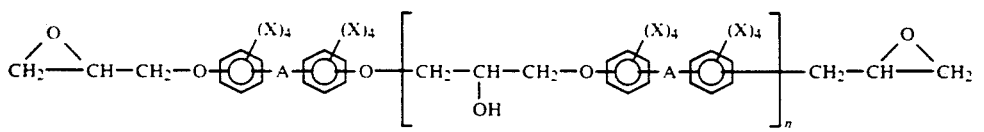

wherein each A is isopropylidene, each X is hydrogen and n has an average value of from about 5 to about 25.

6. The resin composition of claim 1 wherein the reaction product (C) is the reaction product between an epoxy resin of formula I

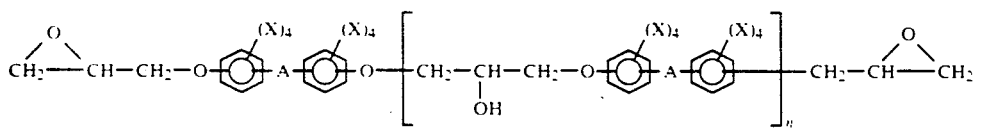

wherein each A is isopropylidene, each X is hydrogen and n has an average value of from 0 to about 15 and a condensed form of phosphoric acid.

7. The resin composition of claim 5 wherein the reaction product (C) is the reaction product between an epoxy resin of formula I

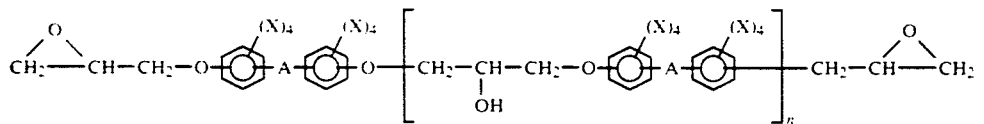

wherein each A is isopropylidene, each X is hydrogen and n has an average value of from 0 to about 15 and a condensed form of phosphoric acid.

8. The resin composition of claim 1 comprising
from about 4 to about 6 weight percent phenolic resin (A),
from about 53 to about 61 weight percent epoxy resin (B) and
from about 35 to about 43 weight percent reaction product (C).

9. The resin composition of claim 8 wherein the epoxy resin (B) is a resin of formula I

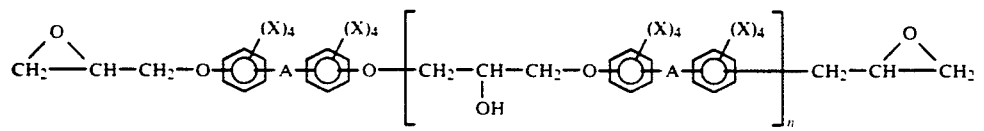

wherein each A is isopropylidene, each X is hydrogen and n has an average value of from about 5 to about 25 and wherein the reaction product (C) is the reaction product between a resin of said formula I wherein each A is isopropylidene, each X is hydrogen and n has an average value of from 0 to about 15 and a condensed form of phosphoric acid.

10. The resin composition of claim 1 wherein the phenolic resin (A) is a polyalkylol phenol wherein the phenolic functionality has been at least partially etherified.

11. The resin composition of claim 2 wherein the phenolic resin (A) is a polyalkylol phenol wherein the phenolic functionality has been at least partially etherified.

12. The resin composition of claim 1 comprising additionally a pigment and a solvent or solvent mixture in such an amount that the total weight of the sum of phenolic resin (A), epoxy resin (B) and reaction product (C) is from about 10 to about 40 percent and the weight of the pigment is from about 10 to about 30 percent, based on the total weight of the sum of (A), (B) and (C), the pigment and solvent (mixture).

13. A method of coating a substrate with a resinous film wherein the resin composition of claim 1 is applied to the substrate and cured thereon.

14. The method of claim 13 wherein the substrate is a metallic substrate.

15. The method of claim 13 wherein the resin composition of claim 10 is applied to the substrate.

16. The method of claim 13 wherein curing takes place at a temperature between about 100° C. and about 300° C. for a period of about 30 seconds to about 30 minutes.

17. A substrate which is at least partially coated with a coating prepared from the resin composition of claim 1.

18. The at least partially coated substrate of claim 17 in which the substrate is a metallic substrate.

19. The substrate of claim 17 which is at least partially coated with a coating prepared from the resin composition of claim 10.

20. The composition of claim 1 wherein said organic solvent comprises a glycol ether, a glycol ester or a ketone.

21. The composition of claim 20 wherein said solvent comprises ethoxyethanol, methoxypropanol, butoxyethanol or an acetate thereof; ethyl acetate, isopropyl acetate, butyl acetate or amyl acetate; or methyl ethyl ketone, methyl isobutyl ketone or cyclohexanone.

22. The composition of claim 20 wherein the total weight of (A), (B) and (C) in the composition is from 20 to 50 percent of the total weight of the composition.

23. A resin composition of claim 1 comprising:
(A) about 5 weight percent phenolic resin,
(B) about 65 weight percent epoxy resin, and
(C) about 30 weight percent epoxy-phosphate ester dissolved in an organic solvent capable of dissolving (A), (B) and (C), said percentages being based upon the total weight of (A), (B) and (C).

* * * * *